US009925626B2

(12) United States Patent
Voigt et al.

(10) Patent No.: US 9,925,626 B2
(45) Date of Patent: Mar. 27, 2018

(54) FORMING PROCESS FOR HOT FORMING A STEEL SHEET OF A ROTOR BLADE TO BE PRODUCED FOR A WIND ENERGY PLANT

(75) Inventors: Burkhard Voigt, Magdeburg (DE); Oliver Labs, Magdeburg (DE); Roy Kersten, Hohenwarthe (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 975 days.

(21) Appl. No.: 14/236,786

(22) PCT Filed: Jul. 3, 2012

(86) PCT No.: PCT/EP2012/062927
§ 371 (c)(1),
(2), (4) Date: Apr. 28, 2014

(87) PCT Pub. No.: WO2013/020757
PCT Pub. Date: Feb. 14, 2013

(65) Prior Publication Data
US 2015/0290752 A1    Oct. 15, 2015

(30) Foreign Application Priority Data
Aug. 5, 2011   (DE) .................. 10 2011 080 497

(51) Int. Cl.
*B23P 15/04*    (2006.01)
*B21D 53/78*    (2006.01)
(Continued)

(52) U.S. Cl.
CPC ............. *B23P 15/04* (2013.01); *B21D 53/78* (2013.01); *B23K 9/18* (2013.01); *B23K 10/00* (2013.01); *B23K 37/047* (2013.01); *Y02E 10/721* (2013.01)

(58) Field of Classification Search
CPC .......... B23P 15/04; B21D 43/06; B21D 53/78
See application file for complete search history.

(56) References Cited

U.S. PATENT DOCUMENTS 3,938,363 A * 2/1976 Kelsey .................. B21D 22/02
72/364
5,113,681 A   5/1992 Guesnon et al.
(Continued)

FOREIGN PATENT DOCUMENTS

CN    1091079 A    8/1994
DE   1 180 709 A    11/1964
(Continued)

OTHER PUBLICATIONS

Situ Blog, "Smith-Putnam Wind Turbine," Sep. 1, 2010, retrieved from http://www.situstudio.com/blog/2010/09/01/smith-putnam/, on Feb. 18, 2015, 5 pages.
(Continued)

*Primary Examiner* — Tu B Hoang
*Assistant Examiner* — Erin McGrath
(74) *Attorney, Agent, or Firm* — Seed Intellectual Property Law Group LLP (57) ABSTRACT

The present invention concerns a forming process for hot forming of a steel sheet of a rotor blade to be produced of a wind power installation, including the steps heating the steel sheet in a furnace while the steel sheet is lying on a hearth bogie, displacing the heated steel sheet with the hearth bogie from the furnace into a pressing apparatus for the hot forming operation, transloading the heated steel sheet in the pressing apparatus from the hearth bogie on to a form bogie having a counterpart form, and pressing the steel sheet by at least one pressing punch which presses on the steel sheet in such a way that it is formed between the pressing punch and the counterpart form and in particular
(Continued)

assumes the shape of the pressing punch and the counterpart form.

4 Claims, 9 Drawing Sheets

(51) Int. Cl.
    *B23K 9/18*     (2006.01)
    *B23K 10/00*     (2006.01)
    *B23K 37/047*     (2006.01)

(56) References Cited

U.S. PATENT DOCUMENTS

| | | | | |
|---|---|---|---|---|
| 5,685,892 | A | * | 11/1997 | Ikoma ................. C22B 15/0036 266/216 |
| 5,919,496 | A | | 7/1999 | Padovani |
| 2008/0190143 | A1 | * | 8/2008 | Balduin .............. C03B 23/0252 65/106 |
| 2011/0031759 | A1 | | 2/2011 | Mitsuoka et al. |
| 2011/0061438 | A1 | * | 3/2011 | Brennand .............. B21D 37/12 72/375 |
| 2011/0094282 | A1 | | 4/2011 | Overrath et al. |

FOREIGN PATENT DOCUMENTS

| | | |
|---|---|---|
| DE | 1 433 768 A | 1/1969 |
| DE | 24 02 190 A | 7/1975 |
| DE | 159 055 A1 | 2/1983 |
| DE | 102009013665 A1 | 12/2010 |
| EP | 2 233 593 A2 | 9/2010 |
| JP | 04090492 A * | 3/1992 |
| JP | 6-106253 A | 4/1994 |
| JP | 10-216865 A | 8/1998 |
| JP | 2011-32988 A | 2/2011 |
| SU | 24376 A1 | 12/1931 |
| SU | 269067 A1 | 1/1970 |
| SU | 662214 A | 5/1979 |
| SU | 774674 A | 10/1980 |
| WO | 2010/100066 A2 | 9/2010 |

OTHER PUBLICATIONS

Wikipedia, "Smith-Putnam wind turbine," retrieved from http://en.wikipedia.org/wiki/Smith-Putnam_wind_turbine, on Feb. 18, 2015, 3 pages.

* cited by examiner

FORMING PROCESS FOR HOT FORMING A STEEL SHEET OF A ROTOR BLADE TO BE PRODUCED FOR A WIND ENERGY PLANT

BACKGROUND

Technical Field

The invention concerns an apparatus and a process for welding steel sheets for producing a rotor blade of a wind power installation. The invention also concerns a process and an apparatus for the manufacture of a rotor blade of a wind power installation. In addition the invention concerns a wind power installation and a rotor blade of a wind power installation. Furthermore the invention concerns an apparatus and a process for the hot forming of a steel sheet of a rotor blade of a wind power installation. In addition the invention concerns an apparatus and a process for cutting steel sheets to size for a rotor blade of a wind power installation.

Description of the Related Art

Wind power installations are known nowadays in particular in the form of so-called horizontal-axis wind power installations. In that case an aerodynamic rotor having at least one and usually three rotor blades rotates about a substantially horizontal axis. In that case the rotor blades are of an aerodynamic configuration and are moved by the wind so that said rotary movement takes place, which can then be converted into electrical energy by an electric generator.

Modern wind power installations have rotor blades which are of increasingly greater size and in particular greater length. In the meantime rotor blades of lengths of about 60 m, of a depth of up to over 8 m and a thickness of up to over 3 m are already known. A connecting flange of such a rotor blade for fixing a rotor hub also nowadays is already of a diameter of over 3.5 m. For rotor blades of such orders of magnitude it may be appropriate for them also to be at least portion-wise made from steel.

Steel production is known from many other technological areas such as for example ship building, but transfer to the manufacture of a rotor blade of a wind power installation is basically not possible because of the very special demands of rotor blade manufacture. In this connection mention is to be made in particular but not definitively of the fact that, in rotor blade manufacture, the aim in spite of everything is to implement a lightweight structure, insofar as that is at all possible when using steel. In addition it is to be noted that a rotor blade of a wind power installation is exposed to permanently changing loads. In that respect there is a change not only in loading amplitude but also loading direction and in particular upon rotary movement of the rotor the force of gravity can involve an ongoing change between tensile and compression loadings. In that respect a rotor blade is a long hollow body which must withstand even a constant and constantly changing flexural loading. In addition to ensuring appropriate stability however the rotor blade must be of an aerodynamic shape and as far as possible is to appropriately retain that shape. All those demands are so special that they require specific consideration dedicated thereto. In particular it is possible to have recourse to previous experience in steel constructions only to a severely limited extent.

For wind power installations, the 'Smith-Putnam Wind Turbine' is known from the 1940s, which used a steel rotor blade. Information about that 'Smith-Putnam Wind Turbine' is to be found on the English Wikipedia page (http://en.wikipedia.org/wiki/Smith-Putnam_wind_turbine). A rotor blade used there can also be found from the Internet, namely the Internet page http://www.situstudio.com/blog/2010/09/01/smith-putnam/.

As can be seen from the foregoing Internet blog the rotor blade of the Smith-Putnam Wind Turbine has been constructed with a rotor blade profile that is constant over the entire axis thereof. That naturally leads to simplifications in terms of production engineering in comparison with today's modern rotor blades which are of an axially continuously varying profile. In that respect the profile changes in the axial direction in size and also in its nature. In addition a rotor blade of a modern wind power installation of today is also twisted in the axial direction to take account of the different afflux flow directions which occur, due to the rotation of the rotor, at different spacings from the rotor hub. Added to that is the fact that particularly large rotor blades and in particular rotor blades of very great depth in the region near the hub must be of a multi-part structure for transport purposes.

The complexity of a modern rotor blade is therefore not to be compared to the rotor blade known from the Smith-Putnam Wind Turbine. Manufacturing a modern rotor blade or a portion of a modern rotor blade from steel thus requires a large number of individual considerations, approaches and solutions.

As general state of the art attention is to be directed to the documents DE 1 433 768 A, DE 1 180 709 A, DD 159 055 A1, DE 24 02 190A and WO 2010/100066 A2.

BRIEF SUMMARY

Therefore the object of the present invention is to address at least one of the aforementioned problems. In particular the invention seeks to provide that rotor blade production of a rotor blade or a part thereof from steel is improved or first made possible at all. At least the invention seeks to propose an alternative solution.

According to one embodiment of the invention there is proposed a process according to claim 1. In accordance therewith hot forming of a steel sheet of a wind power installation rotor blade to be produced is effected in such a way that firstly the steel sheet to be shaped is heated in a furnace. In this case the steel sheet firstly in the form of a flat even plate is disposed on a furnace bogie. After the heating operation the heated steel sheet is moved with the hearth bogie from the furnace into a pressing apparatus for the hot forming operation. The hearth bogie thus travels directly with the steel sheet from the furnace into the pressing apparatus without transloading being effected therebetween. Transloading is then effected in the pressing apparatus, in which case the heated steel sheet is transloaded from the hearth bogie on to a form bogie having a counterpart form. The counterpart form can also be referred to as the form bed. The heated steel sheet is now disposed on the counterpart form and can be pressed. Pressing is effected by a pressing punch or die which is pressed on to the steel sheet in such a way that the steel sheet is formed between the pressing punch and the counterpart form. In particular in that case the steel sheet assumes the shape of the pressing punch and the counterpart form which are matched to each other.

Preferably the operation of transloading the steel sheet is effected in such a way that the steel sheet is lifted off the hearth bogie in the pressing apparatus. The hearth bogie is now separated from the steel sheet and can be moved out therebeneath. Accordingly the space beneath the steel sheet becomes free and the counterpart form is moved with the form bogie into the pressing apparatus under the lifted steel sheet. The steel sheet can now be lowered on to the form bogie and thus on to the counterpart form. As a result any apparatus for performing the lifting operation does not need to be provided in the form of an external apparatus like a fork lift truck. Rather such a lifting means can be stationary. Preferably that lifting apparatus forms a part of the pressing apparatus or is fixedly connected thereto. The transloading operation is thus effected by lifting the steel sheet and changing the two bogies.

Preferably the hearth bogie moves on a rail system from the furnace to the pressing apparatus. It is also desirable for the form bogie to travel into the pressing apparatus on a or the rail system. That makes it possible to achieve a simplification in the operating movements, in particular conveying the heated steel sheet from the furnace into the pressing apparatus and on to the counterpart form. Preferably the hearth bogie and the form bogie use the same rail system and in particular the same pair of rails. That makes it possible to achieve an efficient apparatus which also makes the change of the steel sheet from the hearth bogie to the form bogie correspondingly efficient and practical.

According to one embodiment of the invention there is proposed a forming apparatus for the hot forming of a steel sheet according to claim 4. That forming apparatus includes a furnace for heating the steel sheet, a pressing apparatus for forming the steel sheet and a hearth bogie for transporting the steel sheet from the furnace to the pressing apparatus. In that respect that forming apparatus is particularly adapted to carry out a process as described hereinbefore for hot forming of a steel sheet.

Preferably the furnace has a furnace bottom with a bottom opening and the hearth bogie is characterized by a chassis for moving from the furnace to the pressing apparatus, a carrier table for carrying the steel sheet when being heated in the furnace and when being transported from the furnace to the pressing apparatus, and a carrier structure for connecting the carrier table to the chassis. In that case the carrier structure is so designed that it extends from the chassis through the bottom opening of the furnace to the carrier table in the furnace when the carrier table is carrying the steel sheet in the furnace. In other words the hearth bogie can move with its chassis under the furnace bottom but in that case can hold the carrier table in the furnace by means of the carrier structure.

Preferably the forming apparatus in that case is so designed that the hearth bogie can move into the bottom opening or out of same with the carrier structure when the furnace is opened. In particular the bottom opening is in the form of an approximately slot-shaped opening in the furnace bottom and the carrier structure is of a correspondingly slender configuration so that it can move into that slot-shaped opening when the chassis travels under the furnace. After heating of the steel sheet it can thus be easily transported from the furnace to the pressing apparatus. For that purpose it is only necessary for the furnace to be opened and the hearth bogie can travel across to the pressing apparatus.

Preferably the forming apparatus has a displaceable form bogie for receiving the steel sheet in the pressing apparatus, the form bogie providing a counterpart form or form bed in the forming operation.

Preferably there is provided a rail system for displacement of the hearth bogie from the furnace to the pressing apparatus and for displacement of the form bogie into the pressing apparatus and correspondingly also out of same. In particular there is provided a pair of rails provided from one side of the pressing apparatus through the pressing apparatus and beyond to the furnace. Preferably the spacing between the furnace and the pressing apparatus is kept short. The spacing can be kept of such a size that there the empty hearth bogie, after the heated steel sheet has been transferred on to the form bogie, can be equipped with a fresh cold steel sheet.

Preferably the lifting apparatus which lifts the heated steel sheet for the transloading operation forms a part of the pressing apparatus or is arranged on the pressing apparatus and is preferably operated thereby. In that case the lifting apparatus is in particular so designed that it ensures uniform lifting of the steel sheet from the hearth bogie and equally ensures that the heated steel sheet is uniformly deposited on the form bogie.

Preferably the lifting apparatus has a plurality of lifting arms which are respectively provided with a motion mechanism and which are adapted to laterally engage under the steel sheet. It is proposed in that respect that the lifting arms are so actuated and in particular a corresponding control is provided that they lift the heated steel sheet uniformly, in spite of their own motion mechanisms. As a result the weight is distributed uniformly to the lifting arms and in addition this counteracts the risk that the heated steel sheet could suffer flexural deflection.

The pressing apparatus is intended in particular to push or press basically from above on to the heated steel sheet with a form, while the heated steel sheet rests on a counterpart form or form bed corresponding thereto. Nonetheless it is preferably proposed that a plurality of individual presses are provided for that purpose, in particular eight individual presses are proposed. The necessary force which has to be applied can be distributed to those individual presses. By means of a suitable control system nonetheless the force applied by that plurality of individual presses, in particular therefore eight such presses, is uniformly produced so that the form used for the pressing operation can be pressed down with the total force of the individual presses. The individual presses thus together form a forming die or punch for forming the steel sheet. Preferably the individual presses have their own drive units which for example can be actuated hydraulically or in some other fashion such as for example by means of a toggle lever mechanism.

In addition there is proposed a hearth bogie having at least one of the above-described features or properties.

In the described forming process for the hot forming of a steel sheet it is possible to use steel parts of basically usual structural steel, which are heated in the furnace to their respective forming temperature in order to achieve normalization of the material such as for example steel or aluminum. With one kind of steel the forming temperature is for example 900 to 930° C. The temperature should be observed as accurately as possible in order not to damage the structure of the steel. The steel part, namely the steel sheet, can be a steel sheet which is up to 3×12 m in size and which after the heating operation is moved out of the furnace with the hearth bogie to the forming station, namely the pressing apparatus. In that forming station or pressing apparatus the steel sheet is transferred on to the form bogie with the counterpart form which can also be referred to as the form bed. Thus here the heated steel sheet is lifted by means of a plurality of lifting arms and the hearth bogie is replaced by the form bed. For that purpose both, namely the hearth bogie and the form bogie carrying the form bed, are preferably mounted on the same rails.

The lifting arms are so designed that the steel part is lifted in a direction which is as perpendicular as possible, in which case the steel part, namely the steel sheet, is lying approximately horizontally.

Thus the hearth bogie moves directly into the furnace and from the furnace to the forming station. Hitherto it was known from the state of the art for a steel part to be moved out of the furnace with a bogie which basically formed the complete underside of the furnace, and then to be transferred from there with a fork lift truck. In a preferred solution however it is proposed here that only a narrow aperture in the furnace bottom is used, which is narrower than the width of the steel sheet to be heated.

A preferred pressing apparatus or press can be designed for 640 tons pressing pressure and can be formed by a plurality of and in particular eight individual presses which operate uniformly to apply the necessary total pressure. The specified pressing pressure is a possible example and for example can also be higher or lower, depending on the kind of material and the sheet size.

According to one embodiment of the invention there is also proposed a welding process. Such a welding process is proposed for joining formed steel sheets and in particular steel sheets shaped as described above to afford a rotor blade or a rotor blade segment. For that purpose the steel sheets to be joined are arranged in relation to each other in a preparation arrangement and fixed. That preparation arrangement therefore already basically represents the rotor blade segment to be produced, in which respect fixing can be provided only to such an extent that the welding operation for definitively and fixedly joining the rotor blade can be effected without the formed steel sheets falling apart in that case. That preparation arrangement thus essentially forms a fixed pack. In that preparation arrangement the steel sheets are then joined together by welding at respective contact edges forming a weld gap. The welding operation is effected in that case in the form of submerged arc welding by a welding robot.

Submerged arc welding is basically known in the form of a fully automatic welding process for long straight horizontal weld seams such as for example a longitudinal tube seam. According to one embodiment of the invention it is now proposed that the submerged arc welding process by means of a welding robot be used for the complex forms and thus complex weld seams of a rotor blade segment. In that respect it is to be noted that such a rotor blade segment can be made for example from 24 formed steel sheets. In that respect for example firstly two partial segments can be manufactured each from 12 formed steel sheets. In that case all or at least most of the steel sheets used here are different and accordingly that also involves a large number of different weld seams. Hitherto no submerged arc welding process is proposed in the state of the art for that purpose.

A problem with submerged arc welding is that the powder also covers the respective weld position in order thereby to provide a suitably screened welding condition. Basically the powder is held in its place by the force of gravity. In a preferred embodiment it is now proposed that the preparation arrangement is moved in the welding operation by a movement apparatus, more specifically in such a way that the welding operation is respectively effected on an upwardly facing region of the weld joint. In that case for example the weld joint is a notch or a notch-shaped groove which is produced by two milled edges of two steel sheets to be joined being placed together. That weld joint should be upward as much as possible so that the powder can lie thereon in the welding operation. That can also embrace the situation where the weld joint is in the interior of the preparation arrangement, that is to say basically in the interior of the rotor blade segment to be produced. More specifically the rotor blade segment to be produced is basically a hollow body which for example has an outer skin substantially corresponding to the surface of the rotor blade segment in that region. The steel sheets to be fitted together thus substantially form the outer layer of the rotor blade segment to be produced. Reinforcing struts in the interior of that rotor blade or rotor blade segment can be added and also need welding.

Now for the welding procedure the welding robot which for example can have a robot arm with six joints is moved along the respective weld joint to be welded. In that case the preparation arrangement is moved in such a way, in particular being rotated about a substantially horizontal axis, that the welding robot is admittedly moved in tracking relationship along the weld joint, but finds a respective approximately horizontal portion for the welding operation. Preferably therefore tracking guidance is effected in duplicate fashion, namely a movement, in particular rotation, of the preparation arrangement and therewith the steel sheets in such a way that the weld seam is approximately horizontal, the welding robot performing the remaining tracking guidance along the weld joint.

Preferably the preparation arrangement is thus rotated during the welding operation, this being effected in particular at varying speed. The rotor blade segment is of a rather elongated hollow profile in cross-section, with respect to a rotor blade longitudinal axis. By virtue of rotation at a varying speed, it is possible to take account of that fact. In particular the rotor blade is rotated slowly or at times not at all when a correspondingly long profile portion is upward or downward so that the welding robot has sufficient time to weld along a corresponding horizontal weld seam. Accordingly the rotary movement is performed more quickly when only a short portion such as for example a rotor blade leading edge is facing straight down or up in the rotary movement, and is welded.

Preferably the rotary speed can be varied with knowledge of the respective profile portion to be welded, in dependence on a corresponding angular position in respect of such rotation.

Preferably the contact edges of two respective formed steel sheets are provided in that case with a bevel so that together they are of a notch or wedge shape. That wedge or notch shape promotes the welding operation insofar as at least one weld seam can be produced in the submerged arc welding process in that notch-shaped groove. It is to be noted that a clean tidy weld is important and it is pointed out that usually a number of weld seams are to be implemented in that one weld joint.

According to one embodiment of the invention there is also proposed a welding apparatus for joining formed steel sheets to provide a rotor blade or rotor blade segments. That welding apparatus has at least one welding robot for joining the steel sheets which are adjacent in the preparation arrangement by a submerged arc welding process. There is also provided a motion apparatus for moving the preparation arrangement so that the welding operation can be carried out in each case on an upwardly facing region of the weld joint. That welding apparatus is adapted in particular to performing the above-described welding process in accordance with at least one of the specified embodiments.

Preferably there is provided a hand control means with which a welder can switch over to manual operation on site and can assist or further guide the robot with the hand control means in the welding operation. In principle manual submerged arc welding is problematical because the welder cannot see the weld seam and thus the welding result or the welding procedure because of the powder. Nonetheless such manual intervention can be appropriate, particularly when the welding robot comes away from the seam or threatens to do so. That can be the case for example when the welding robot is entirely or partially oriented to a pre-programmed configuration of the seam, but the seam deviates from the pre-programmed configuration thereof. Here re-adjustment can now be effected manually by for example the welding robot being moved back on to the weld seam or the center thereof.

Preferably in this case a rotor blade segment to be manufactured is welded together from 24 steel formed parts, that is to say steel sheets which have already been formed. The steel formed parts, that is to say steel sheets, are for that purpose put into position and welded. For the welding operation, a bevel is provided when cutting the steel sheets to size so that the bevels of two steel formed parts which are fitted together form a notch or similar gap. That notch is welded with an SAW process, namely the above-mentioned submerged arc welding process, with a plurality of layers and by means of a welding robot. Usually robots do not weld in an SAW process but they do that only in respect of one layer because after the step of welding each layer the powder has to be removed, which requires manual operation.

Preferably the welding robot is adapted partially for manual operation insofar as it can weld automatically, but in that case a welder observes the operation of the welding robot and can possibly intervene. A suitable control stick which is colloquially also known as a joystick can be provided for that purpose. A good welder can hear the quality of the weld seam and the intervention can be meaningful as a result, in most cases however manual intervention will be restricted to the welder performing a correcting intervention if the part actually to be welded deviates from the basic part, in particular deviating slightly.

The SAW process presupposes that the respective seam to be welded is downward so that the powder does not slip away. For that purpose in an embodiment it is proposed that the rotor blade is to be rotated in such a way that the location which is just to be welded is respectively downward. If a peripherally extending seam is being welded the rotor blade segment is to be continuously rotated. In that respect it is to be borne in mind that the rotor blade segment is not circular and the rotary speed is preferably matched thereto. Preferably the motion apparatus and in particular the rotating apparatus for rotating the rotor blade segment has three axes of rotation. The welding robot preferably has six joints to have corresponding degrees of freedom.

According to one embodiment of the invention there is also proposed a cutting process for cutting formed steel sheets of a wind power installation rotor blade to be produced to size by means of a plasma robot. The term plasma robot is used here to denote a laser robot which cuts the steel sheet by means of a laser beam.

It is proposed that the cutting process firstly takes place in such a way that the workpiece is put on to a form table, namely being fixedly clamped thereon. The table is fixedly connected to the plasma robot so that there is a fixed known link to the robot axes. A processing head of the plasma robot is then guided on the workpiece along a three-dimensionally extending provided cutting line in order to measure the workpiece in that region and to detect any deviations between the workpiece and the underlying original part and to establish the cutting line for the specific workpiece, the cutting line also being referred to hereinafter as the guide cutting line. In that case in particular the spacing from the processing head to the workpiece is detected and the processing head is guided along the surface of the workpiece at a spacing relative thereto, that is as constant as possible. To measure the spacing, a small plasma current already flows, which provides that a marking line which can also be referred to as the marking seam is produced at the intended cutting line that is adapted to the workpiece. In the measurement operation the plasma robot records the altered cutting line, which more specifically has been adapted to the workpiece, which is thus deposited as the guide cutting line and corresponds to the marking seam. For the sake of simplicity features of the measurement procedure can also be explained in connection with placement of the marking seam although placement of the marking seam or at any event the result of the placed marking seam is not unconditionally important.

In the steps of positioning and/or clamping the workpiece on the form table, a base plane is established, which should represent for example a central plane for the specific workpiece. That base plane can be selected differently for different workpieces. It is preferably adopted for workpieces of the same structure and is thus selected in identical fashion. In the measuring operation and preferably also in the cutting operation, two directions of movement are important, which are referred to hereinafter as the stamping direction and the piercing direction, or in simplified form as stamping and piercing. Movements which are performed perpendicularly to said base plane are referred to as stamping. Movements which take place in the working direction, that is to say in the direction in which a cutting laser of the plasma robot also faces, are referred to as piercing. Those directions, stamping and piercing, can thus be identical, namely where the laser is perpendicular to the base plane. The laser is for example perpendicular to the base plane where the current processing position of the workpiece is in plane-parallel relationship with the base plane.

Figure 8:
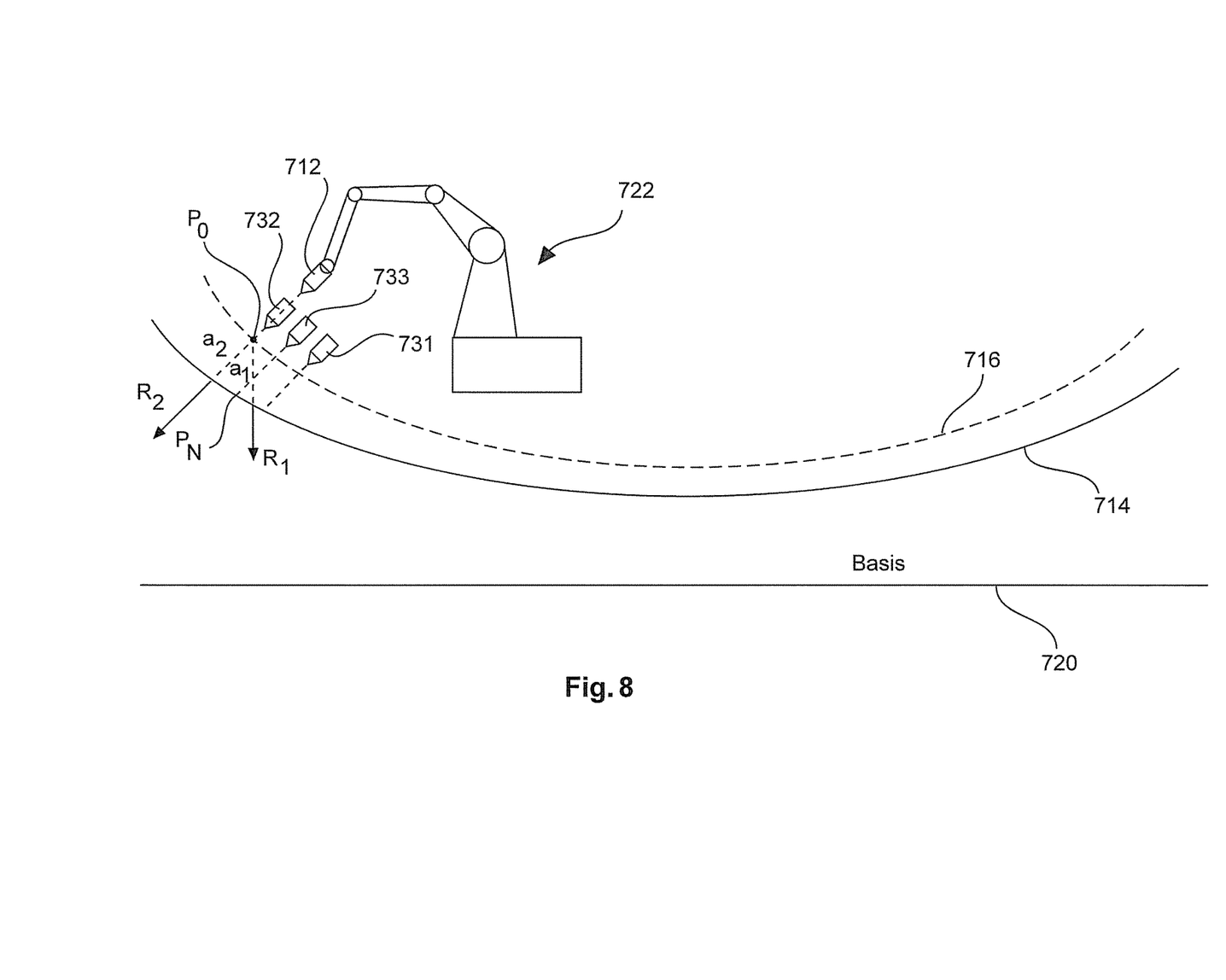
FIG. 8 shows the tracking function of a processing head of a plasma robot, and FIG. 9 diagrammatically shows a portion from FIG. 8.
Figure 9:
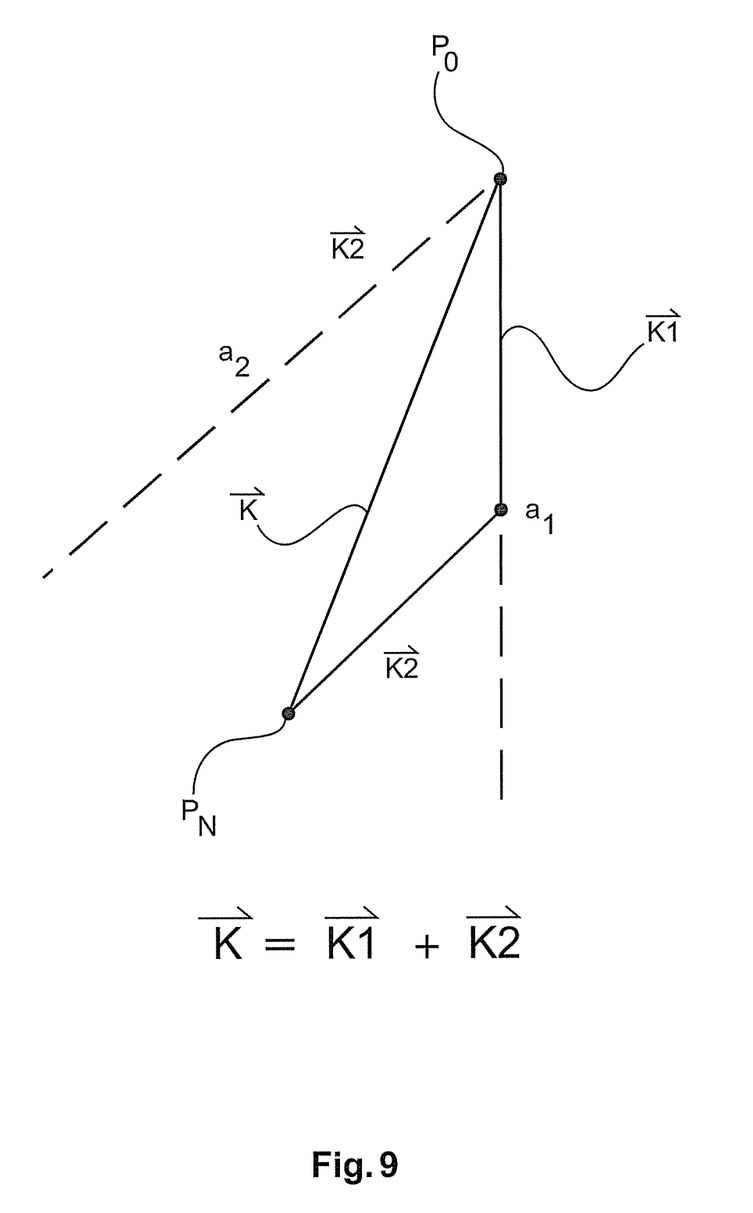

While the processing head is guided along the intended cutting line deviations in respect of the workpiece, in particular in relation to the stored original part, in respect of height, are to be expected, namely in the stamping direction, that is to say perpendicularly to the base plane. Such a deviation nonetheless make itself noticeable to the plasma robot as a deviation in the piercing and stamping direction as long as the two directions do not coincide. Accordingly tracking guidance of the processing head of the plasma robot can thus also be effected at an approximately constant spacing in the stamping and/or piercing direction. Preferably a correction value which has a component in the stamping direction and a component in the piercing direction is determined from those deviations for trackingly guiding the processing head. Particularly preferably a mean correction value which takes account of both deviation components is formed from both deviation components. If 'a1' is the deviation in the stamping direction and 'a2' is the deviation in the piercing direction a correction value 'k1' in the stamping direction and a correction value 'k2' in the piercing direction can be calculated as follows:

$$k1=0.5*a1;\ k2=0.5*a2$$

The resulting correction is afforded by vectorial addition of the two correction components. In the above calculation a1 and a2 are respectively 50% involved. Alternatively it is possible to implement a weighting g1 and g2 for a1 and a2 respectively. That then gives the following relationships:

$$k1=g1*a1;\ k2=g2*a2$$

For g1=g2=0.5 both calculation rules are identical. Ideally the total of g1 and g2 is equal to 1. To take account of minor non-linearities it may be appropriate for that total to differ from 1 by a few percent, in particular to be greater than 1 by 1 to 5% if the processing head measures the workpiece from the concave side or 1 to 5% smaller if the processing head measures the workpiece from a convex side. Preferably measurement is made from the concave side.

From practical points of view therefore it must be assumed that the obtained formed steel sheet to be cut, namely the workpiece, is not exactly of the ideally assumed form, namely that of the original part, and in addition also varies from a steel sheet which is formed as the closest being theoretically identical. Thus the marking seam which reproduces the measured seam is in reality not identical to the cutting line because the formed steel sheet part usually is not of the idealized form.

It is then proposed that the steel sheet is cut by means of a processing head of the plasma robot by the processing head being controlled in accordance with the guide cutting line established in the measuring operation. The marking seam reproduces that established guide cutting line. In that case guidance along the marking seam is preferably effected based on the values recorded in measurement of the specific workpiece so that the possibly visible marking line is at any event not required by the robot. In that respect it is to be emphasized once again that a large number of different steel sheets have to be assembled to produce the rotor blade segment, and those sheets have to be previously cut to size and shape after they have been formed. Those formed steel sheet parts require a cutting line and thus ultimately a cutting edge which is in practice not constant in any of the three Cartesian directions. Thus a three-dimensionally extending cutting line or three-dimensionally extending marking seam is used to mean such a line or seam which is not in a plane. Thus here there is a substantially more complex shape for the line or seam, than would be the case for example when cutting a tube. When such a tube is cut, in particular transversely relative to the longitudinal direction, the result is a circular cutting edge. Naturally that tube which is taken by way of example is three-dimensional and the circular cutting edge also extends basically in space, but there is a plane in which that circular cutting edge, given by way of example, is disposed, namely usually a plane in relation to which the longitudinal axis of the tube forms the normal line. And if in that respect such a circular cutting edge can be completely considered as a two-dimensional cutting edge, only the plane is correspondingly involved.

That is not the case with the complex formed steel sheets as are the basis of the present invention, at least for some cutting edges. The present cutting process is thus based on a three-dimensional control, namely tracking guidance of the processing head in three Cartesian directions.

Preferably the proposed cutting process also performs the operation of cutting a bevel as preparation for a notched or wedge-shaped weld joint, as was described hereinbefore in connection with the welding process. In that way it is already possible to prepare in the cutting operation for the intended submerged arc welding procedure which is proposed here by means of a plurality of layers, namely a plurality of weld seams per weld join.

In addition there is proposed a plasma robot for cutting formed steel sheets to size for a rotor blade to be produced of a wind power installation. That plasma robot includes a processing head with a laser beam generator for delivering a laser for cutting the steel sheet. In addition there is a motion mechanism, in particular a multi-joint robot arm, for moving and trackingly guiding the processing head. In addition there is a sensor for detecting a marking seam and/or for detecting the surface of the steel sheet. In particular the plasma robot is adapted to perform a cutting process as described hereinbefore at least in accordance with one of the stated embodiments.

Thus at least in accordance with an embodiment for cutting the shaped or formed steel sheets to size there is proposed a plasma robot, that is to say a laser robot. Such a process provides firstly effecting measurement of the formed steel sheets along a desired cutting line, namely the so-called original cutting line, and in so doing establishing a specific cutting line, namely a so-called guide cutting line, wherein a marking seam corresponding to the guide cutting line can be implemented. In this case therefore deviations from the ideal form of the steel sheets are taken into consideration. In measuring, establishing the guide cutting line and placing the marking seam the robot is adapted to the specific contour which in that respect it basically follows. In that case, by way of the plasma beam, it acquires items of information about the spacing relative to the steel sheet, that is to say relative to the wall of the steel part, and can thus track its respectively current position. The precise trajectory of movement which corresponds to the guide cutting line is in that case recorded and stored in the control system. The robot then orients itself to that trajectory in the subsequent cutting operation. As a particularity here attention is to be once again directed to the fact that the object to be cut, namely the shaped or formed steel sheet, is a three-dimensional object in the sense that the surface changes in three Cartesian directions. That results in the above-mentioned problem that upon deviations in the surface from the ideal form, a decision is to be taken as to the direction in which the laser beam is to be adjusted. If therefore a piercing operation is to be effected, namely in the direction of the laser beam, or a stamping operation, namely transversely to the base plane. It is proposed here that a combination or a compromise of both directions is to be involved.

Moreover in the cutting operation the cooled steel part, that is to say which has cooled down after the hot forming operation, is held on a suitable support by means of a hydraulic device. The metal sheet is pressed down on that support and deformation in the cutting operation is to be avoided thereby.

In addition there is proposed a rotor blade of a wind power installation, which includes a steel portion having a plurality of steel sheets, wherein the steel sheets were formed with a forming process according to one embodiment the invention, joined with a welding process according to one embodiment of the invention and/or cut to size with a cutting process according to one embodiment of the invention.

In addition there is proposed a wind power installation comprising one or more such rotor blades.

BRIEF DESCRIPTION OF THE SEVERAL
VIEWS OF THE DRAWINGS

The invention is described in greater detail by way of example hereinafter by means of embodiments with reference to the accompanying Figures.

DETAILED DESCRIPTION

Hereinafter identical references can be used for similar but non-identical components to emphasize the common aspects of the functionality of some such components.

Figure 1:
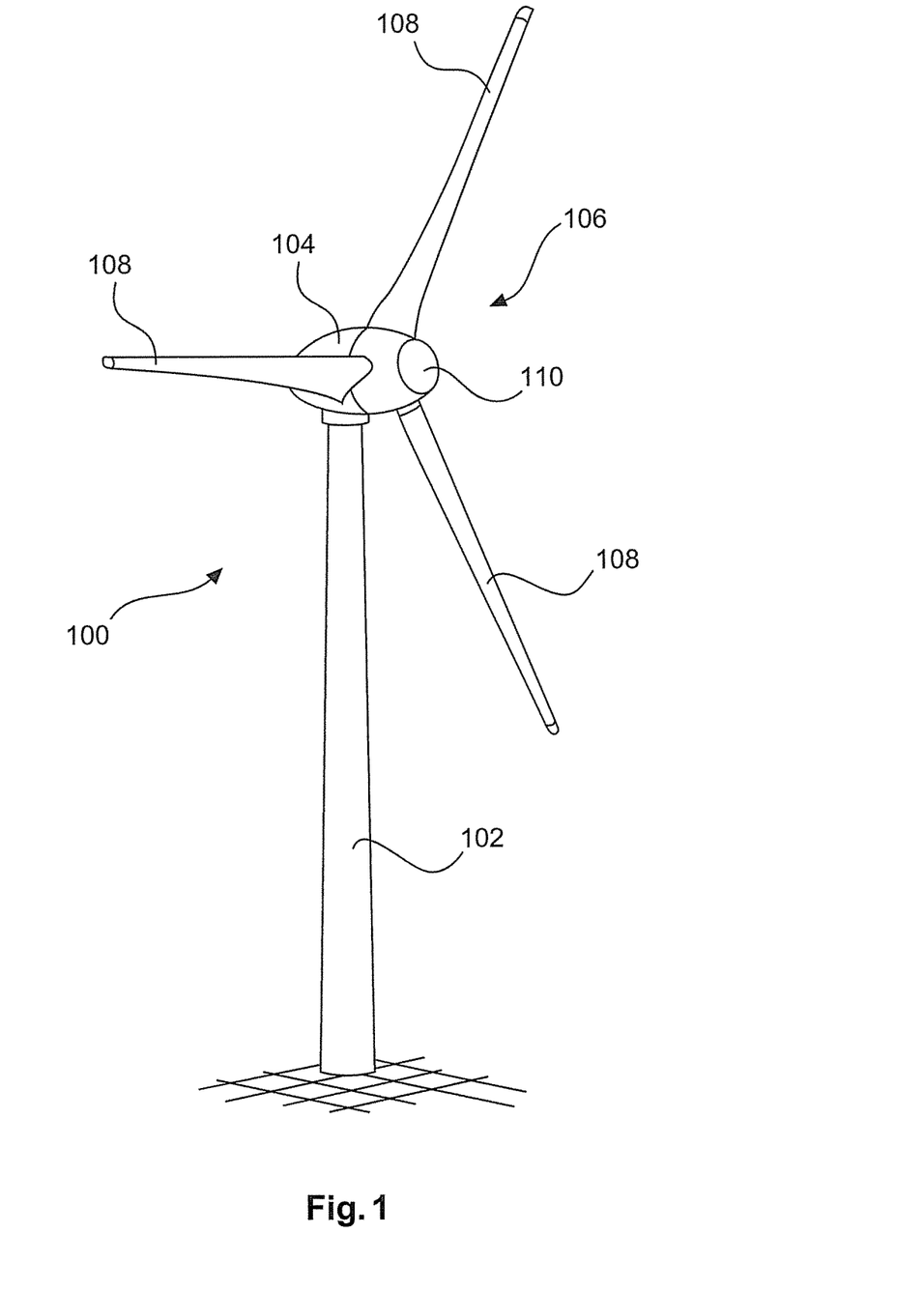
FIG. 1 shows a perspective view of a wind power installation.

FIG. 1 shows a wind power installation 100 comprising a pylon 102 and a pod 104. Arranged on the pod 104 is a rotor 106 with three rotor blades 108 and a spinner 110. In operation the rotor 106 is caused to rotate by the wind and thereby drives a generator in the pod 104.

Figure 2:
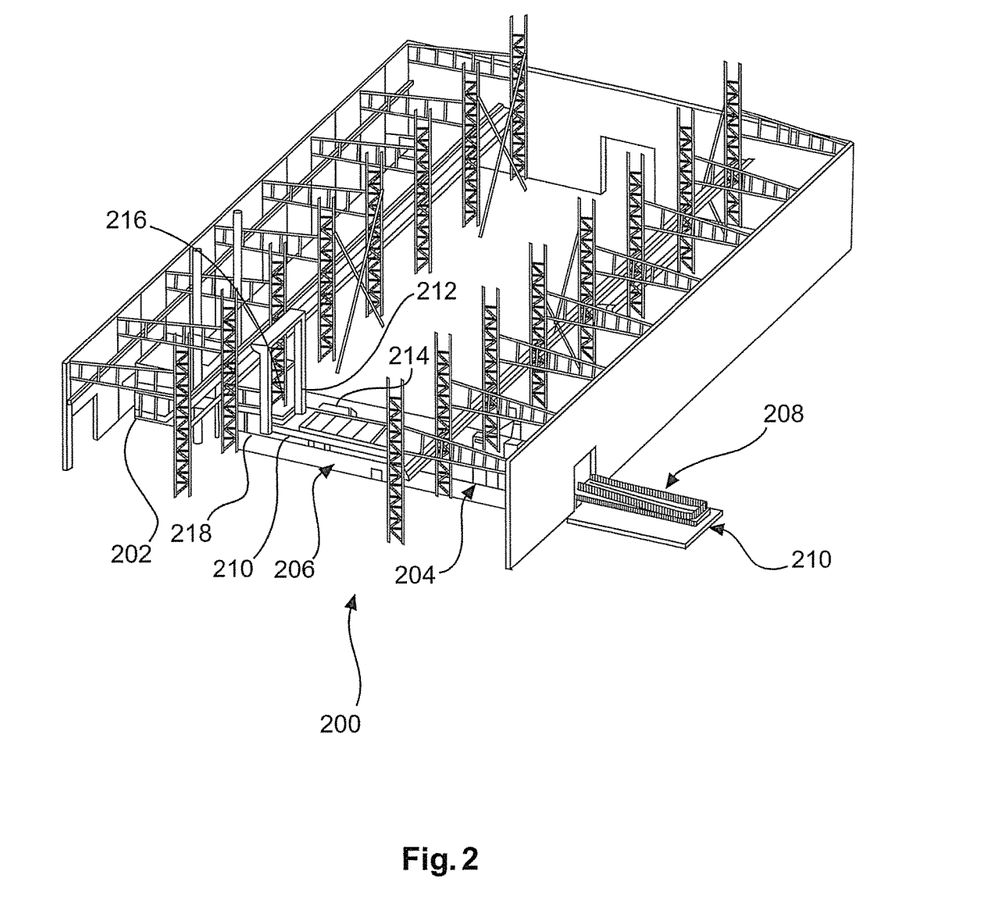
FIG. 2 shows a perspective view of a forming station.

FIG. 2 shows a perspective view illustrating the overall configuration of a forming station 200. Essential components of that forming station 200 are the furnace 202 which here is in the form of an annealing furnace, the pressing apparatus 204 which can also be referred to as the pressing stand, a hearth bogie 206 which transports steel sheets from the furnace 202 to the pressing stand 204, a form bogie 208 on to which the steel sheet is transferred from the hearth bogie 206 in the pressing apparatus 204 and a rail system 210 connecting the furnace 202 and the pressing stand 204. The perspective view in FIG. 2 shows an opening 212 of the furnace 202, through which the hearth bogie 206 can move a steel sheet to be heated into the furnace 202 and out of it again. For that purpose the hearth bogie 206 moves on the rail system 210 which basically includes only one pair of rails, with the carrier table 214, into the furnace 202. In that case the steel sheet is carried on the carrier table and is thus conveyed into the furnace 202. The drawing in FIG. 2, by way of illustration, does not show such a steel sheet. In this case the rail system 210 is laid below the furnace 202 or below the furnace bottom 216. An elongate bottom opening 218 is provided in the region of the furnace 202 in the furnace bottom 216 above the rail system 210.

Figure 3:
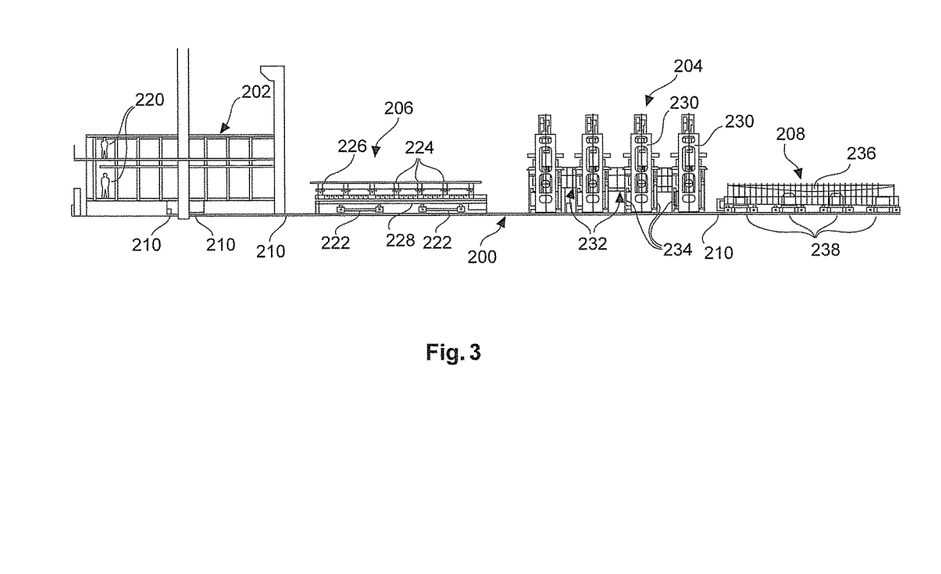
FIG. 3 shows a side view of the forming station of FIG. 2.

As shown in FIG. 3, the side view of the forming station 200 shows the structure thereof and illustrates inter alia the continuously extending rail system 210 which extends into the structure of the furnace 202 but which is not laid in the furnace 202 as such, but beneath that furnace. Two people 220 are shown by way of illustration in the region of the furnace 202 to demonstrate the size of the arrangement.

A hearth bogie 206 which has a chassis 222 and a carrier table 224 is supported and guided on the rail system 210. The carrier table 224 is provided with a multiplicity of support points, on which the steel sheet 226 which is to be heated or which has been heated rests. In that respect the carrier table does not have a table plate, but only that multiplicity of support points. The carrier table 224 is connected to the chassis 222 by way of a suitably connecting carrier structure 228.

The rail system 210 extends as far as the pressing apparatus or pressing stand 204 which has eight individual presses 230 which are arranged in two rows along the rail system 210 and of which four individual presses 230 can be seen in FIG. 3. Those eight individual presses 230 jointly move a forming punch or die 232.

Besides the individual presses 230 the Figure also shows lifting arms 234 of which sixteen are provided in the illustrated embodiment, of which eight can be seen in FIG. 3. The steel sheet 226 is lifted from the hearth bogie 206 by means of those lifting arms 234 when the hearth bogie 206 has arrived in the pressing stand or pressing apparatus. When the steel sheet 226 is lifted by those lifting arms 234 the hearth bogie 206 moves to the position shown in FIG. 3 again and thus out of the pressing stand. The illustrated form bogie 208 then travels into the pressing stand 204 under the steel sheet 226 which has been lifted by means of the lifting arms 234. The steel sheet 226 can then be lowered on to the form bogie 208 by means of the lifting arms 234. In that way the steel sheet 226 comes to lie on a counterpart form or block 236 which can also be referred to as the form bed 236. The heated steel sheet 236 can then be pressed by means of the form or the forming punch 232, actuated by the eight individual presses 230, so that the steel sheet 226 can assume the shape of the forming punch 232 and the form bed 236 which is adapted thereto.

The form bogie 208 is thus shown in FIG. 3 in a waiting position outside the pressing stand 204. The form bogie has a form bogie chassis 238 which has a very high level of stability and which is capable of carrying high forces as it not only has to carry the steel sheet 226 but also the weight of the form bed 236.

Figure 4:
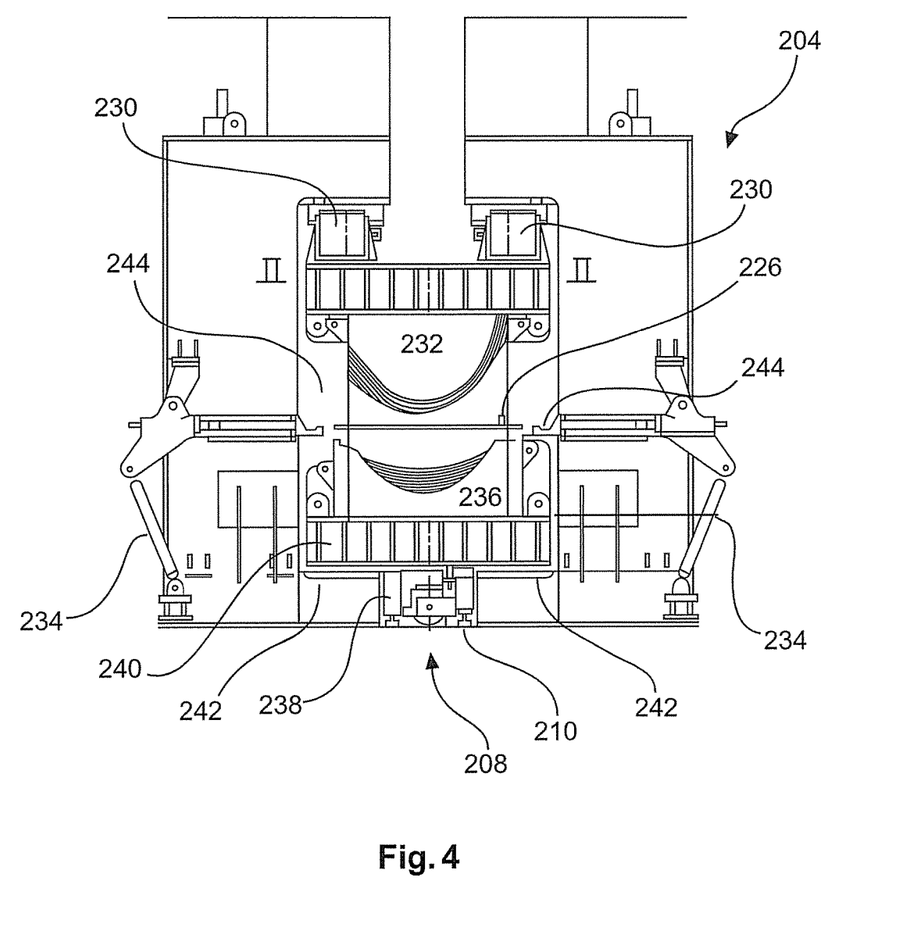
FIG. 4 shows a front view of a pressing apparatus or a pressing stand.

FIG. 4 shows a front view of the pressing stand 208 and in that respect shows a front view of the forming punch 232 on the form bogie 208, and also shows the lifting arms 234.

The forming punch 232 is moved by eight individual presses 230 simultaneously and uniformly on to the form bed 236 for forming the steel sheet 226. The form bogie 208 travels with its form bogie chassis 238 on the rail system 210 and carries the form bed 236 by way of a form carrier 240. For pressing the steel sheet 226 the form carrier 240 can be deposited on a carrier support 242 arranged on both sides of the form bogie chassis 238. That can provide that, in the operation of pressing the steel sheet 226, the enormous pressing forces which occur in that case do not have to be carried by the form bogie chassis 238. For lifting and lowering the steel sheet 226 the arrangement has the lifting arms 234 which have sheet supports 244 with which the lifting arms 234 can reach under the steel sheet 226. The selected mechanism for the lifting arm 234 provides for perpendicular lifting of the steel sheet 226, that is as uniform as possible.

Figure 5:
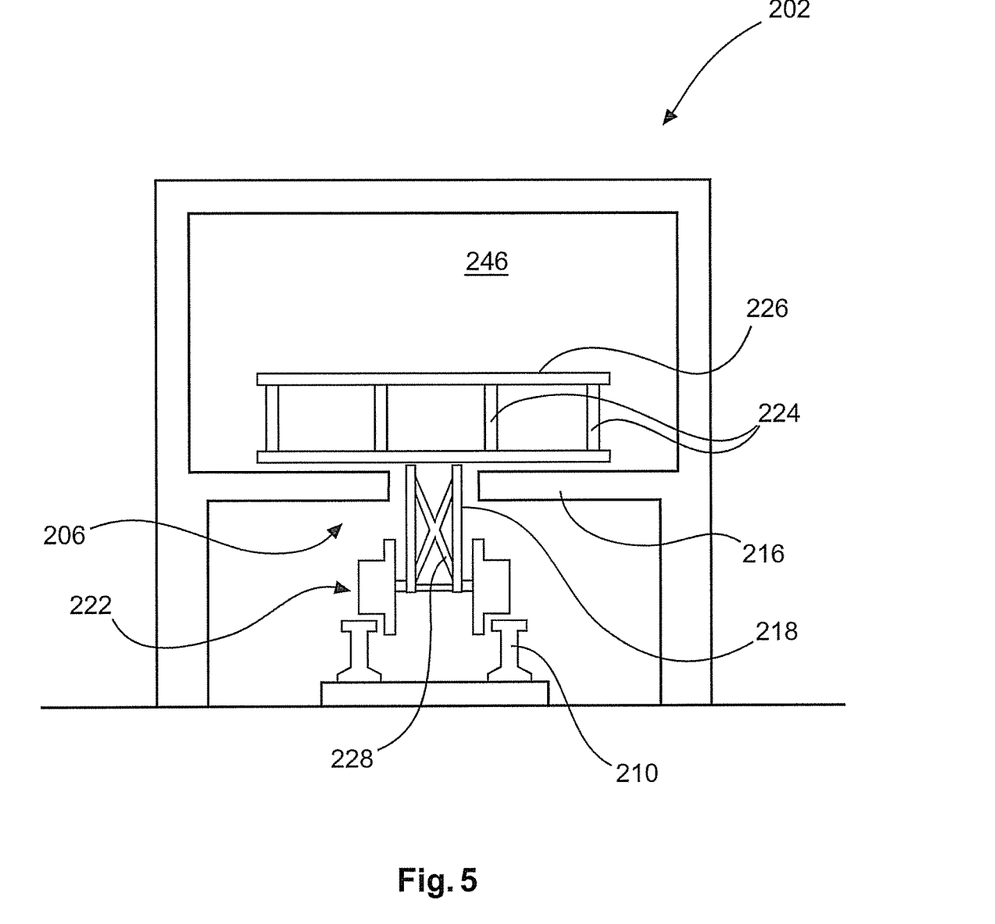
FIG. 5 shows a front view of a furnace with a hearth bogie.

FIG. 5 shows a diagrammatic front view of the furnace 202 and the hearth bogie 206. The furnace 202 has a furnace interior 246 and at least one furnace bottom 216. The hearth bogie 206 is supported with its chassis 222 on the rail system 210. A carrier structure 228 extends through the elongate bottom opening 218 into the furnace chamber 246 from the chassis 220. The carrier table 224 is disposed in the furnace chamber 246 and is carried by the carrier structure 228. Shown on the carrier table 224 is a steel sheet 226 which is heated in the furnace 202 and thus in the furnace chamber 246.

Figure 6:
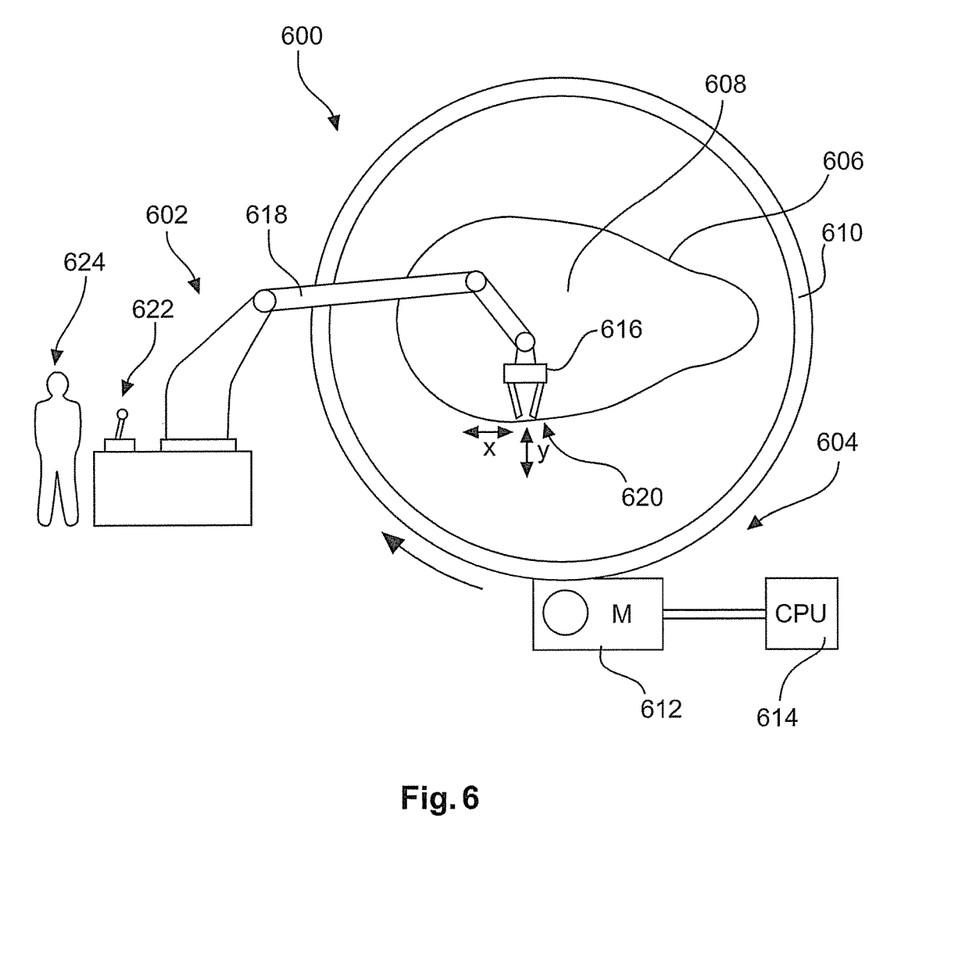
FIG. 6 diagrammatically shows a welding apparatus for submerged arc welding of a rotor blade segment.

The welding apparatus 600 diagrammatically shown in FIG. 6 includes a welding robot 602 and a motion apparatus 604. A rotor blade segment 606 is fixed in the motion apparatus 604. The fixing means is not shown in the view in FIG. 6. In that way the rotor blade segment 606 can be rotated about a longitudinal axis 608 by means of the motion apparatus 604. The longitudinal axis 608 extends into the plane of the drawing and is illustrated here only as a dot. The motion apparatus 604 for that purpose has a rotary ring 610 which rotates about that longitudinal axis 608. A drive motor 612 is provided for that purpose, being actuated by a process computer 614.

The welding operation is performed by a welding head 616 which forms a processing head and which is arranged on a multi-joint robot arm 618 of the welding robot 602 and is guided thereby. The welding operation is effected in each case at the current weld location 620 on the rotor blade segment 606. FIG. 6 shows the current weld location 620 in the form of a weld location arranged in the interior of the rotor blade segment 606. It is equally possible to produce an outwardly disposed weld seam which in each case is disposed appropriately at the top on the rotor blade 606.

By rotation of the rotary ring 610 and thus rotation of the rotor blade segment 606 about the longitudinal axis 608 the motion apparatus 604 provides that the current weld location 620 is always arranged on a horizontal portion of the rotor blade segment 606. In the situation of the illustrated internal welding this means that the rotational apparatus 604 provides that the current weld location 620 is always disposed substantially downwardly. In the case of external welding this basically means that the current weld location 620 is substantially always disposed upwardly.

In this respect the precise position of the current weld location 620 alters in two directions perpendicular to the longitudinal axis 608 and illustrated in FIG. 6 as the x- and y-directions. Depending on the respective configuration of the seam to be welded, there can also be a movement in the direction of the longitudinal axis 608. For the sake of completeness it is pointed out that the illustrated rotor blade segment 606 which prior to the welding operation can also be referred to as the preparation arrangement 606 substantially represents a hollow body serving as a basis for a rotor blade or part of a rotor blade. A specific aerodynamic shape therefore does not yet have to be provided at this stage in the operation of welding the hollow body. In particular elements such as for example a trailing edge profile which converges to a point can be added later.

To take account of the change in position of the current weld location 620 the welding robot 602 guides the welding head 616 in tracking relationship with the respectively current weld location 620 by means of the robot arm 610 shown for illustration purposes. It is pointed out that the arrangement of the welding robot 602 in FIG. 6 is only by way of illustration. In particular the robot arm 618 will not extend through the rotary ring 610 and also not through a skin of the rotor blade segment 606. Rather, the robot arm 618 is guided in the longitudinal direction approximately along the axis of rotation 610 through the rotary ring 610 and into the rotor blade segment 606. Such a robot arm can be of a length of over 20 m and in particular a length of up to 35 m.

In addition provided on the welding robot 602 is a hand control means 622, by means of which a person 624 can also manually intervene in the welding control.

Figure 7:
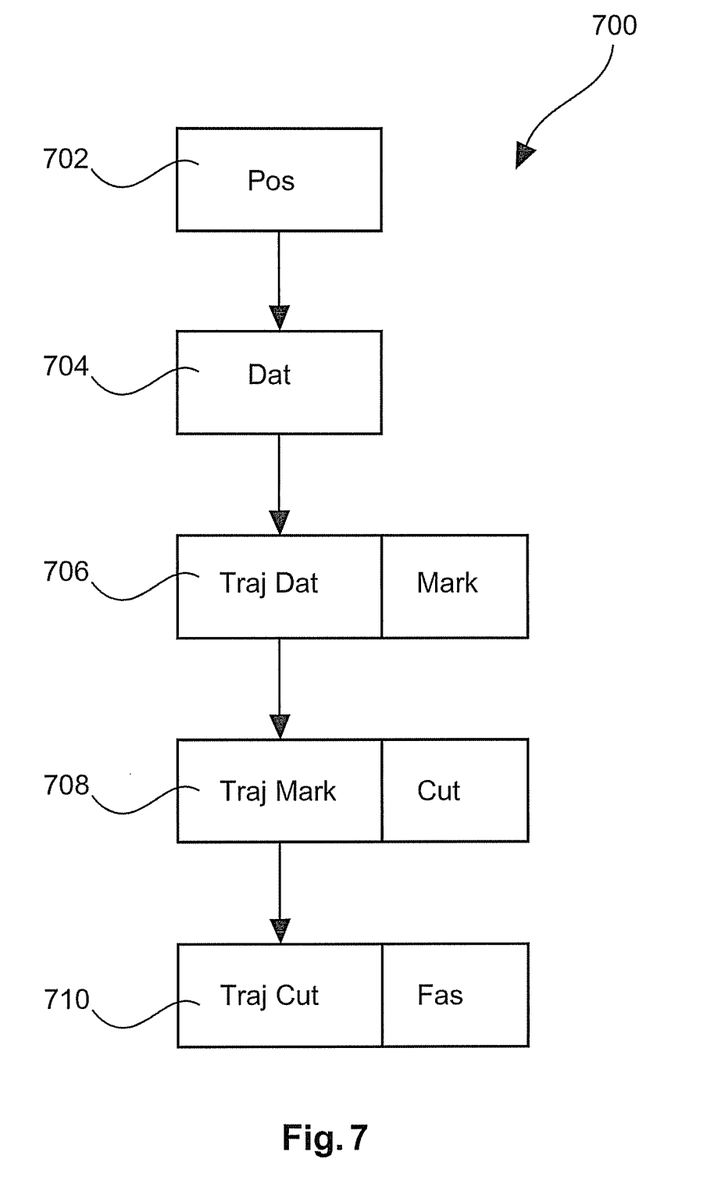
FIG. 7 shows a flow chart for cutting a steel sheet by means of a plasma robot.

FIG. 7 shows a simplified flow chart for the operation of cutting a formed steel sheet by means of a plasma robot, that is to say by means of a robot which cuts the formed steel sheet by a laser. The flow chart 700 begins in the positioning block 702, where the shaped steel sheet is fixed in a predetermined position and thus positioned.

Then, as indicated by data block 704, the procedure involves a selection of the data in which the data are stored in particular for the steel sheet which is currently to be cut, for the corresponding cutting line, in particular for an intended original cutting line. The data block 704 is logically arranged downstream of the positioning block 702 as it is only establishing the steel sheet to be cut that makes it clear which data set is to be used. For example, different formed steel sheets can be used for producing a rotor blade segment of steel as indicated at 24. In principle however the time succession of the positioning block 702 and the data block 704 can be in the reverse direction. Simultaneous implementation can also be considered.

Then, in dependence on the selected data, a desired cutting line, namely the intended original cutting line is travelled as the trajectory in the marking block 706 and in that part of the procedure the steel sheet is measured and a guide cutting line adapted to the steel sheet measured in that way is determined and stored, and a marking seam is set. In that respect the marking seam is the visible result, which gives its name to the marking block 706. Determining and storing the guide cutting line is important. It is determined while the processing head, namely the welding head, is moved in tracking relationship with the actual configuration of the steel sheet, based on the original cutting line.

Then in the cutting block 708 which can also be referred to as the cut block 708 the plasma robot or its processing head is again moved over the steel sheet, more specifically based on the previously recorded guide cutting line and thus along the marking seam set in the marking block 706. In that case tracking displacement of the processing head is effected very precisely and in that respect cutting of the steel sheet is effected along the marking seam.

The steel sheet is now cut to size and the bevel block Fas 710 can then follow for one, several or all edges of the steel sheet which has now been cut to size, in which block 710 the plasma robot travels with its processing head along the edges in question and bevels same in order thereby to prepare a weld groove in the form of a notch shape when two edges having such a bevel, that is to say correspondingly two steel sheets, are fitted together.

The cutting operation is thereafter basically concluded and the steel sheet can be removed from its fixing and subjected to further processing. FIG. 8 shows a plasma robot 722 with a processing head 712. FIG. 8 also diagrammatically shows an actual operation of cutting the steel sheet 714 to size, a solid line having been adopted to illustrate that, while a broken line illustrates an assumed steel sheet 716 which stands for an original steel sheet and thus an original processing part which forms the basis for establishing an original cutting characteristic line which can also be viewed as the optimum cutting characteristic line. In addition FIG. 8 diagrammatically shows a base plane 720. Basically this diagrammatic view shows the base plane 720 and the two steel sheets 714 and 716 as a side view which however is purely diagrammatic. In particular the two steel sheets 714, 716 can also be curved into the plane of the drawing, which is not shown here for the sake of simplicity.

In that respect FIG. 8 shows a snapshot of the processing head 712 when measuring the steel sheet 714 which is actually present, to be processed. The processing head 712 shown in this snapshot illustrates an idealized position in respect of the point P0 on the assumed original steel sheet 716. In the stamping direction $R_1$ from the point P0 there is a spacing a1 in relation to the actual steel sheet 714. In addition in the piercing direction $R_2$ from the point P0 there is a spacing a2 in relation to the actual steel sheet 714. There is now a large number of possible ways of trackingly guiding the processing head 712 on the basis of the detected deviation in relation to the actual steel sheet 714. If the processing head 714 is altered by the spacing a1 in the stamping direction $R_1$ for correction purposes, that gives the illustrated processing head position 731. If instead the processing head 712 is only altered by the spacing a2 in the piercing direction $R_2$ for correction purposes, that results in the second position 732 of the processing head. In accordance with an embodiment however there is proposed a correction which involves a combination of the two corrections, which leads to the first position 731 and the second position 732 respectively. That proposed third position is identified by reference 733 for the processing head. That position takes account both of the deviation a1 in the stamping direction $R_1$ and also the deviation a2 in the piercing direction $R_2$. The precise calculation is explained for that purpose in FIG. 9.

FIG. 9 firstly shows on an enlarged scale only the two spacings a1 in the stamping direction and a2 in the piercing direction. It is proposed here that half the spacing a1 in the stamping direction be used as the correction vector $\vec{k1}$. Half the spacing a2 in the piercing direction is used as the correction vector $\vec{k2}$. Vectorial addition leads to the overall correction vector $\vec{k}$. It is possible therewith to determine the new point $P_N$ from the optimum point P0. The new point $P_N$ is also shown in FIG. 8 and corresponds to the third position 733 of the processing head. That calculation of the correction for the processing head 712 having regard both to the deviation a1 in the stamping direction $R_1$ and also the deviation a2 in the piercing direction $R_2$ leads to an advantageous result, namely advantageous calculation of the new point $P_N$ and therewith the corrected position 733 of the processing head.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process for forming a rotor blade for a wind power installation, the process comprising:
heating a steel sheet in a furnace while the steel sheet is lying on a hearth bogie;
displacing the heated steel sheet and the hearth bogie from the furnace into a pressing apparatus;
transloading the heated steel sheet in the pressing apparatus from the hearth bogie on to a form bogie having a counterpart form compatible with at least a portion of a rotor blade, wherein the form bogie travels on a form bogie chassis, wherein a form carrier rests on the form bogie chassis and carries the counterpart form, wherein transloading includes:
lifting the steel sheet from the hearth bogie;
moving the hearth bogie from beneath the steel sheet;
moving the counterpart form of the form bogie under the steel sheet,
lowering the steel sheet on to the counterpart form of the form bogie;
depositing the form carrier on a carrier support during a pressing operation; and
during the pressing operation, pressing the steel sheet by at least one pressing punch that presses on the steel sheet in such a way that the steel sheet assumes the shape of the pressing punch and the counterpart form and forms at least the portion of the rotor blade, wherein pressing forces from the pressing punch are prevented from being exerted on the form bogie chassis.

2. The process according to claim 1 wherein the hearth bogie is moved from the furnace to the pressing apparatus on a rail system and the form bogie is moved into the pressing apparatus on the rail system.

3. The process according to claim 1 wherein lifting the steel sheet from the hearth bogie and lowering the steel sheet on to the counterpart form of the form bogie comprises using a lifting apparatus for uniformly lifting the steel sheet from the hearth bogie and for uniformly setting the steel sheet down on the counterpart form of the form bogie.

4. The process according to claim 1 wherein lifting the steel sheet comprises using a lifting apparatus that has a plurality of lifting arms that engage with the steel sheet to hold the steel sheet while the steel sheets are lifted.

* * * * *